United States Patent [19]

McIntyre

[11] Patent Number: 4,651,442

[45] Date of Patent: Mar. 24, 1987

[54] NOZZLE ASSEMBLY FOR VEHICLE DRYING APPARATUS

[75] Inventor: Ronald McIntyre, Guelph, Canada

[73] Assignee: Wash World Industries Limited, Mississauga, Canada

[21] Appl. No.: 787,597

[22] Filed: Oct. 15, 1985

[30] Foreign Application Priority Data

Oct. 12, 1984 [CA] Canada .................................. 465341

[51] Int. Cl.$^4$ ............................................. F26B 15/12
[52] U.S. Cl. .................................. 34/229; 34/243 C; 239/556; 239/565
[58] Field of Search ................. 34/243 C, 243 R, 222, 34/229; 239/556, 565

[56] References Cited

U.S. PATENT DOCUMENTS

| | | | |
|---|---|---|---|
| 3,808,703 | 5/1974 | Kamiya | 34/243 C |
| 4,559,721 | 12/1985 | Hanna | 34/243 C |
| 4,561,193 | 12/1985 | Burger | 34/243 C |

Primary Examiner—Larry I. Schwartz
Attorney, Agent, or Firm—Rogers, Bereskin & Parr

[57] ABSTRACT

A nozzle assembly for a vehicle, e.g. car drying apparatus has a housing with an inlet for air. In use, the inlet is connected by a hose to a source of air such as a fan. A main partition in the housing divides the air flow into first and second substantially equal flows on either side of the partition. A flow dividing member divides the second flow into two equal parts. Two, second nozzles are formed for these two parts of the flow, and a first nozzle is provided on the other side of the partition for the first flow.

15 Claims, 4 Drawing Figures

… …

NOZZLE ASSEMBLY FOR VEHICLE DRYING APPARATUS

FIELD OF THE INVENTION

This invention relates to a nozzle assembly for a vehicle drying apparatus.

DESCRIPTION OF THE PRIOR ART

Vehicle drying apparatus are used in conjunction with car wash plants, to dry vehicles after washing, to ensure that the vehicle is as clean as possible without any marks. Known drying apparatus include a nozzle connected by flexible ducts to air pumps or producers. The nozzle is mounted by a linkage that permits movement of the nozzle. A washed vehicle is driven through the apparatus, and under the nozzle. The linkage enables the nozzle to follow the profile of the vehicle and to remain a uniform distance from it. For this purpose, the nozzle is provided with wheels, to enable it to travel over the vehicle. As the nozzle travels over the vehicle, warm air is pumped through the nozzle, to dry the outside of the vehicle.

It has been found that this known arrangment has some disadvantages. After a vehicle has been washed, a considerable quantity of water remains on the surface of the vehicle, in the form of drops, or even quite large pools of water. This occurs predominantly on the larger horizontal surfaces, such as the roof, hood and trunk lid. Known nozzle designs essentially provide a stream of air directed vertically downwards. Whilst a small portion of this air flow is deflected to either side, the air flow has little effect in moving any standing water of the surface of the vehicle. It has been found that, to obtain efficient drying, it is necessary that the air flow serves to move standing water off the horizontal surfaces. If this water is not moved, as opposed to simply being evaporated, then the drying capacity of the apparatus is not sufficient to evaporate all the standing water. As a consequence, the vehicle will not be properly dried. What is required is a nozzle which will blow standing water off horizontal surfaces, so that the air flow need then only evaporate any small droplets or thin films of water remaining on the vehicle surface.

SUMMARY OF THE INVENTION

The present invention provides a nozzle assembly for use in a drying apparatus, and a vehicle drying apparatus including a nozzle assembly. The nozzle assembly has a housing with an inlet for connection to an air supply hose. In use, the inlet is connected, by a hose to a source of air such as a fan. The housing includes a main partition within the housing that divides the air flow from the inlet into a first flow on one side of the partition and a substantially equal second flow on the other side of the partition. A first nozzle is defined on the one side of the partition. A flow dividing member is provided between the partition and the housing. This flow dividing member divides the second flow into two substantially equal flow portions. Two second nozzles for the two flow portions are defined between the housing, the main partition and the flow dividing member.

The housing preferably has side walls that taper outwards, and first and second walls extending between the side walls and tapering inwards. The first nozzle is then defined by the main partition, portions of the side walls and the first wall. Each second nozzle is then defined by parts of a respective side wall, the main partition, the second wall and the flow dividing member. First and second central partitions can be provided. The first central partition divides the first nozzle into two halves, and the second central partition forms part of the flow dividing member. The assembly preferably then has two inlets opening on either side of the central partitions.

In use, substantially half the air flow through the assembly flows through the first nozzle, and through each of the second nozzles approximately ¼ of the air flows. The air flow through the main first nozzle provides a uniform air flow over the surface of the vehicle, to dry it. The air flow through the two side nozzles, due to their angle, serves to blow away any standing water on the surface of the vehicle, and additionally to dry side portions of the surface of the vehicle adjacent to the nozzle.

It is expected that the nozzles of the present invention should provide a considerably approved drying performance in comparison to known nozzles. By separating the air flow into different portions, one obtains considerably better removal of standing water from the surface of the vehicle. It has been found that it is necessary to provide two discrete outlets directed sideways, to ensure good removal of standing water. Experience shows that this effect cannot satisfactorily be achieved by providing a single nozzle, incorporating means for deflecting part of the flow sideways.

BRIEF DESCRIPTION OF THE DRAWINGS

For a better understanding of the present invention, and to show more clearly how it may be carried into effect, reference will now be made by way of example, to the accompanying drawings, which show a preferred embodiment of the present invention, and in which.

DESCRIPTION OF THE PREFERRED EMBODIMENT

Figure 1:
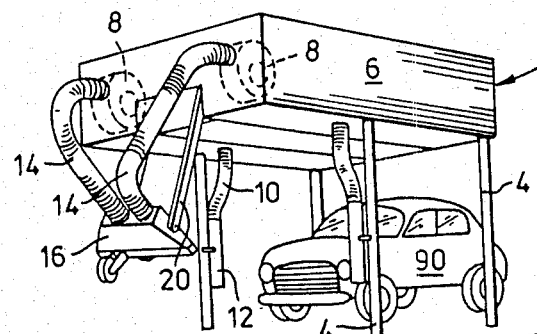
FIG. 1 shows a perspective view of the vehicle drying apparatus according to the present invention, and a vehicle.

Referring first to FIG. 1, there is shown a vehicle drying apparatus, generally denoted by the reference 1. A vehicle 2 is shown beneath the apparatus 1.

The vehicle drying apparatus 1 has four legs 4, and supported on the legs 4 a main drying unit 6. Within the drying unit 6, there are fans or producers for pumping air. These producers are shown by broken lines at 8. Two hoses 10 and associated outlet tubes 12 are provided for drying the sides of a car. For clarity, the producers for these hoses 10 are not shown. The producers 8 draw in air from the surrounding atmosphere, and have outlets connected to hoses 14. All the hoses are corrugated flexible hoses. The hoses 14 are connected to inlets of a nozzle assembly 16.

Figure 4:
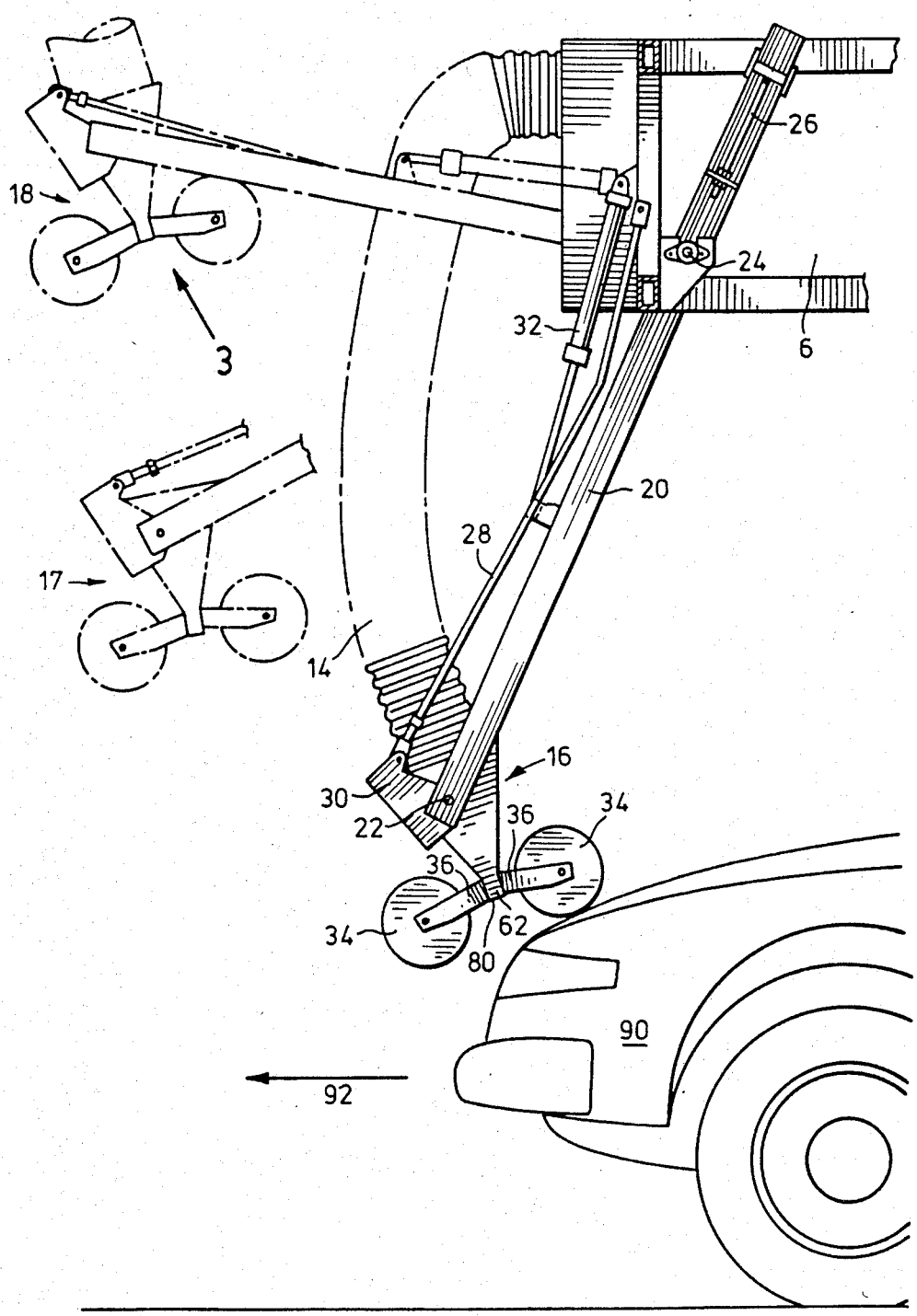
FIG. 4 shows a side view of part of the apparatus of FIG. 1 and a front of a vehicle.

As is shown most clearly in FIG. 4, the nozzle assembly 16 is connected by support arms 20 to the drying unit 6. The support arms 20 are pivotally attached by pivots 22 to the nozzle assembly 16, and by bearings 24 to the drying unit 4. The arms 20 continue above the bearings 24 and are provided with an adjustable counterweight 26. Additional positioning arms 28 are provided for controlling the angular position of the nozzle assembly 16. One end of each positioning arm 28 is pivotally attached to the drying unit 6, whilst the other end is pivotally attached to a bracket 30 of the nozzle assembly 16. The pivots 22 are additionally secured to the brackets 30.

As shown in FIG. 4, the nozzle assembly 16 can move in an arc relative to the drying unit 6, whilst maintaining the same angular position. The support and positioning arms 20, 28 are so arranged as to form a parallelogram linkage. In FIG. 4 a lowermost position of the nozzle assembly is indicated by the reference 16, whilst two higher positions are shown in dotted lines and indicated by the references 17, 18. For controlling the position of the nozzle assembly, two piston and cylinder asemblies 32 are provided. The cylinder of each assembly 32 is attached to the drying unit 6, whilst the piston is attached to one of the support arms 20. In use, the counterweight 26 is adjusted, so that it just raises the nozzle assembly 16 to its uppermost position 18. Then, to bring the nozzle assembly 16 down against a vehicle, air at a small preset pressure is supplied to the piston and cylinder assemblies 32. Additionally, the piston and cylinder assemblies 32 can include shock absorbing means, such as an oil damper, to restrict any sudden movement of the nozzle assembly 16.

The nozzle assembly 16 is further provided with two wheels 34 mounted via brackets 36.

Figure 2:
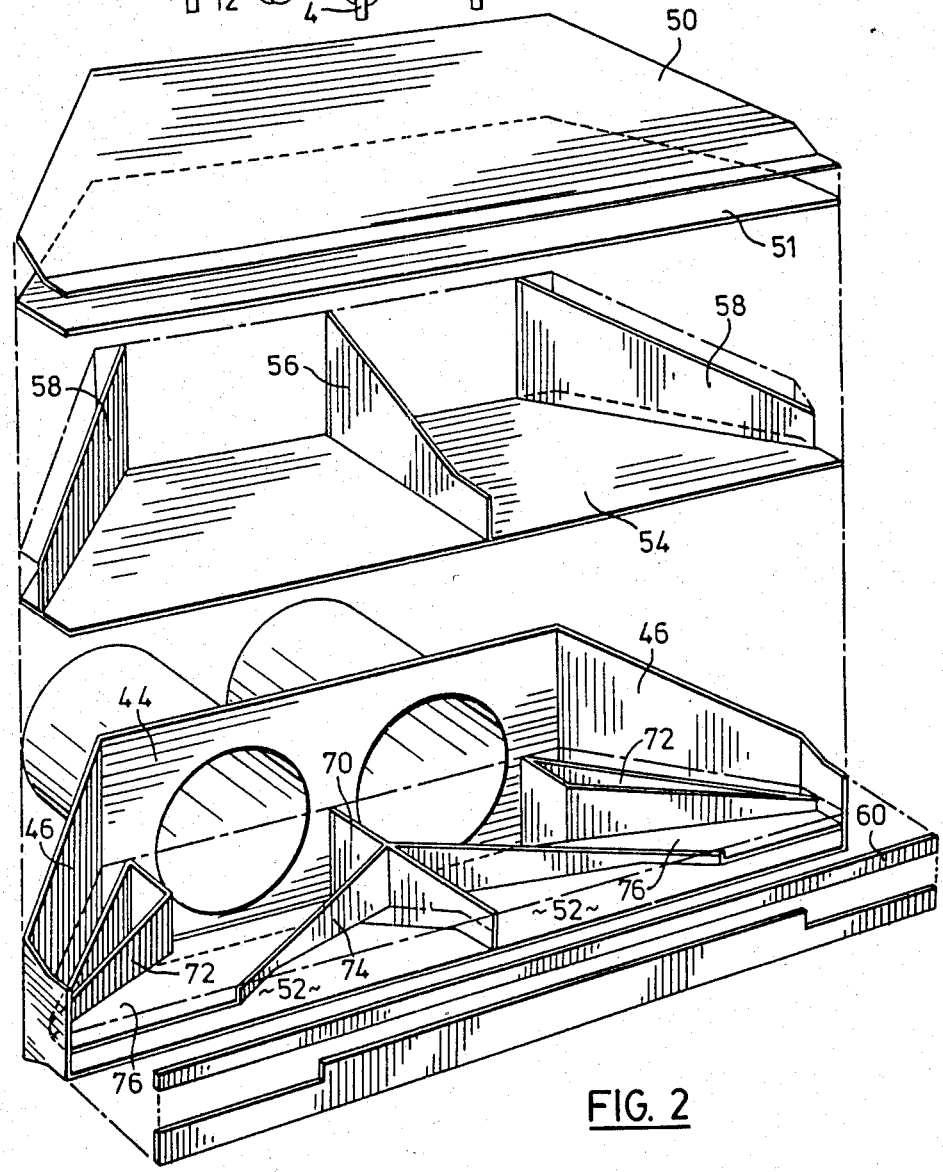
FIG. 2 shows, on an enlarged scale, an exploded view of a nozzle according to the present invention.
Figure 3:
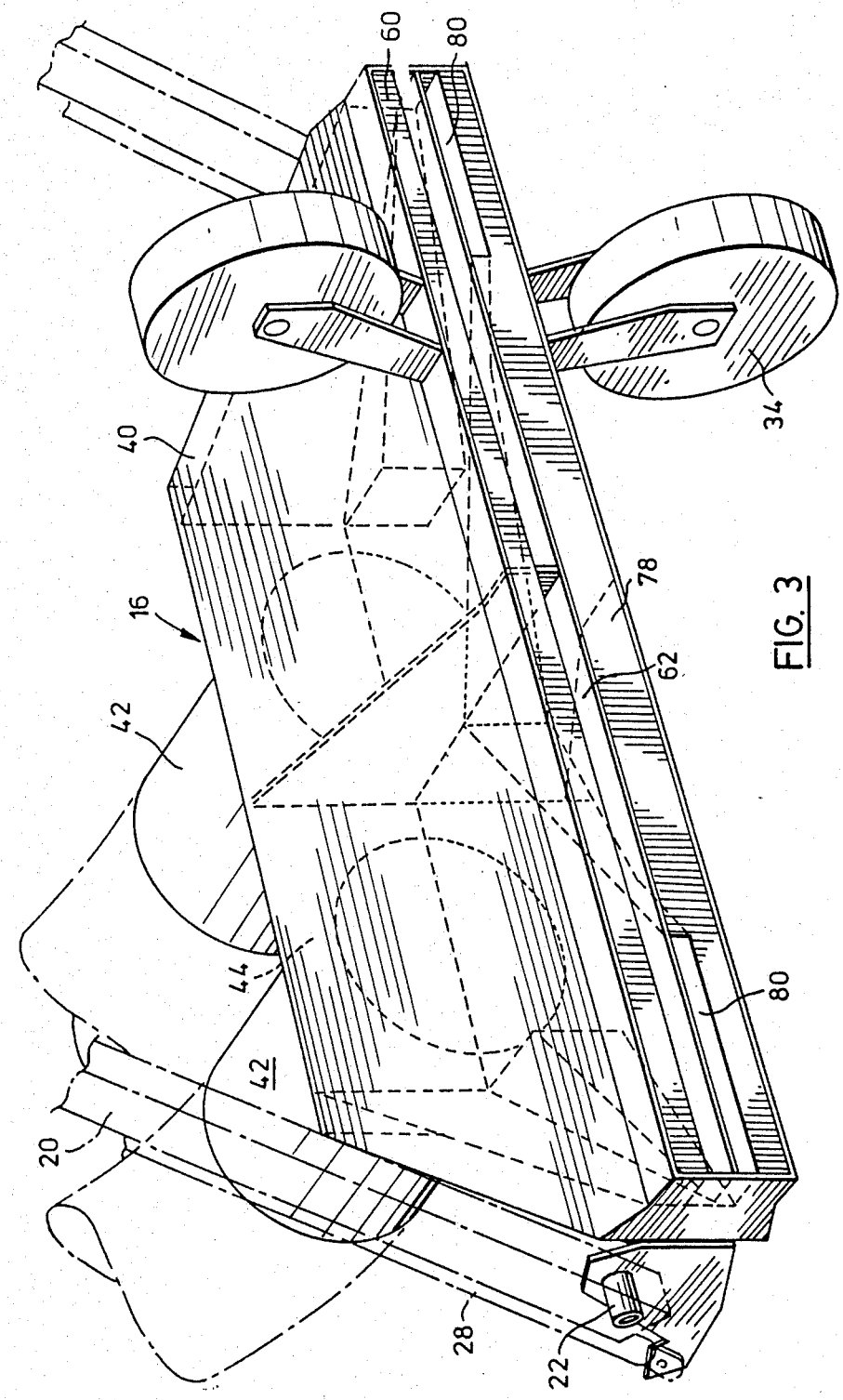
FIG. 3 shows a view of the nozzle of FIG. 2, and associated components.

FIGS. 2 and 3 show details of the nozzle assembly 16. The nozzle assembly 16 comprises a housing, denoted by the reference 40. The housing 40 includes two inlet ducts 42 of circular section, for connection to the hoses 14. These inlet ducts 42 are secured to a back plate 44. The back plate 44 is continuous with two side walls 46, which are inclined relative to the back wall 44. End portions 48 of the side walls 46 are parallel to one another and extend perpendicularly relative to the back wall 44. A first or top wall 50 and a second or bottom wall 52 are provided to complete the outside of the housing.

Inside, a partition 54 is provided, which is located symmetrically between the first and second walls 50, 52, and extends between the side walls 46. A first central partition 56, and two first side partitions 58 are provided between the main partition 54 and the first wall 50. An edge strip of the first wall 50 is bent at an angle, so as to be parallel to the partition 54. An inner first wall 51 is provided, parallel to, and spaced below, the first wall 50. This inner first wall extends between the side walls 46. A first nozzle outlet is defined between the inner first wall 51, the partition 54 and the first side partitions 58. A rectangular strip 60 is mounted to cover the space between the first wall 50 and the inner wall 51 as shown in FIG. 3. The first nozzle outlet has the profile shown in FIG. 3, and is indicated by the reference 62.

Beneath the partition 54, as viewed in FIG. 2, a second central partition 70 is provided. In addition, two second partition elements 72 of triangular profile are provided. A further flow dividing partition 74 intersects the second central partition 70. Each side of the flow dividing partition 74 is parallel to a corresponding side of one of the side partition elements 72.

An edge portion of the second or bottom wall 52 is arranged at an angle to a main portion of it, so as to be parallel to the main partition 54. Extending between the flow dividing partition 74 and the two side partitions 72 are panels 76, which are uniformly spaced from the second wall 52. Across the end of the nozzle assembly 16, a strip 78 is provided. The strip 78 closes off the space between the panels 76 and the second wall 52, and in a central region the space between the main partition 54 and the second wall 52. Consequently, two second nozzle outlets are formed, as indicated at 80 in FIG. 3.

Sound insulation material is provided between the first wall 50, the inner wall 51, between the first side partitions 58 and the side walls 46, between the side partition elements 72 and the side walls 46, and between the second wall 52 and the panels 76.

The profile of the first nozzle outlet 62 tapers inwards, between the main partition 54 and an inner first wall 51, whilst the side partitions 58 taper outwards. The overall effect is to achieve a uniform reduction in the flow cross-section, in the normal direction of air flow, which causes the air to accelerate as it approaches the first nozzle outlet 62. The flow cross-section increase provided by the outward taper of the side partitions 58 is considerably less than the flow cross-section decrease caused by the inward taper between the main partition 54 and the inner first wall 51.

Similarly, for each of the second nozzle outlets 80, there is a uniform decrease in flow cross-section, as the air approaches the actual nozzle outlet. Here, the relevant portions of the two triangular side partitions 72 and the flow dividing partition 74 are parallel to one another, but the panels 76 taper inwards towards the main partition 54.

The main partition 54 is arranged on the axis of the two circular section inlets 42, so that the flow from these two inlets 42 is divided evenly between the first nozzle 62 and the second nozzle 80, with half the flow going to the first nozzle 62 and half going to the second nozzles 80. As the two second nozzles 80 are of the same size, the same quantity of air flows through both nozzle, i.e. ¼ of the total air flow flows through each nozzle 80.

In use, the counterweight 26 is preferably adjusted, so that there is a small net weight tending to keep the nozzle assembly in its uppermost position 18. Then, to maintain the nozzle assembly against a vehicle, a small pressure is supplied to the piston and cylinder assembly 32. This pressure tends to bring the nozzle assembly down to the position 16 shown in FIG. 4.

In FIGS. 1 and 4, a vehicle is generally denoted by the reference 90. To dry the vehicle, it is moved slowly through the drying apparatus 1. This can be achieved either by simply driving the vehicle through, or by providing a mechanism for moving the vehicle through the apparatus at a slow steady speed. When the vehicle 90 reaches the nozzle assembly 16, the forward wheel 32 contacts the vehicle, as shown in FIG. 4. Typically, this wheel 32 will contact the vehicle near the front of its hood. Depending on the vehicle type, the pressure supplied to the piston and cylinder assembly 32 can be adjusted to maintain the nozzle assembly against the vehicle at any desired pressure.

As the vehicle continues to travel beneath the nozzle assembly, as indicated by the arrow 92 in FIG. 4, the nozzle assembly deflects to follow the profile of the vehicle. Thus, when the roof of the vehicle reaches the nozzle assembly, the nozzle assembly will rise up to a position around that shown at 17. The parallelogram linkage formed by the arms 20, 28 ensures that the orientation of the nozzle assembly remains constant, as indicated at the positions 16, 17 and 18. Depending upon the exact portion of the vehicle adjacent the nozzle assembly, either one or both of the wheels 32 will contact the vehicle, to maintain the nozzle assembly 16 at a required spacing from the vehicle.

As shown in FIG. 4, the first nozzle 62 is provided ahead of the second nozzles 80. Air supplied from the producers 8 then flows through these nozzles 62, 80, to provide a rounded fan-like air flow over the horizontal or near horizontal surfaces of the vehicle. For these surfaces, the air flow from the first nozzle 62 is primarily deflected forwards and backwards, with some slight deflection sideways. It should additionally be noted that the output taper of the first nozzle 62 causes some air flow sideways. The nozzles 80, located behind the first nozzle 62, provide substantial side flows. These side flows serve to blow away any standing water or large droplets from the horizontal surfaces. This water is either blown entirely off the surface and down the sides of the vehicle, or where applicable, into gutters, such as the gutters around the edge of the hood. Since any such standing water is moved or displaced, the air flow from the nozzles 62,80 then only has to dry the small amount of water remaining on the vehicle.

It is to be appreciated that the location of the second nozzles 80 behind the first nozzle 62 provides a desired patent for the air flow from the nozzle assembly 16. If the nozzles 80 were located ahead of the third nozzle 62, then a rounded front to the air flow from the nozzle 16 would not be provided. This could result in a pool of water being trapped along the centre line of the vehicle between the two nozzles 80. Then, as the vehicle passed beneath the nozzle assembly 16, this pool of water would be driven along the centre line by the flow from the first nozzle 62.

I claim:

1. A nozzle assembly for use in a vehicle drying apparatus, the nozzle assembly comprising: a housing having an inlet for connection to an air supply hose; a main transverse partition within the housing dividing air flow from the inlet into a first part flow passing on one side of the partition and a substantially equal, second part flow passing on the other side of the main partition with the second part flow behind the first part flow; a first nozzle, for the first part flow, defined by the housing and said one side of the main partition; a flow dividing member located between the first partition and the housing and dividing the second part flow into two substantially equal flow portions; two second nozzles for the two flow portions, defined between the housing, the main partition and the flow dividing member, the two second nozzles being arranged symmetrically on either side of an axis of the nozzle assembly and being directed to either side of the nozzle assembly; whereby, in use, when the nozzle assembly is arranged generally perpendicularly above a horizontal surface with the second nozzles behind the first nozzle, air flow from the first nozzle is primarily deflected both forwards and backwards in a longitudinal direction, and air flows from the second nozzles are deflected primarily sideways, to displace standing water sideways off the horizontal surface, a rounded air flow pattern being formed in front of the nozzle assembly.

2. A nozzle assembly as claimed in claim 1, wherein, for each of the first and second nozzles, the cross-section decreases in a direction from the inlet of the housing to an outlet of that nozzle, to cause acceleration of air flow through the nozzle assembly.

3. A nozzle assembly as claimed in claim 2, wherein the housing comprises an end wall, in which the inlet is located, two side walls extending from either side of the end wall, and first and second walls extending from the end wall and between the side walls, to define an outer periphery of the housing.

4. A nozzle assembly as claimed in claim 3, wherein the main partition extends between the side walls, and the first and second walls are disposed symmetrically on either side of the main partition.

5. A nozzle assembly as claimed in claim 4, which includes an inner first wall disposed inside the housing adjacent and spaced from the first wall, two side partitions, corresponding to the two side walls, and disposed within the housing adjacent and spaced from the side walls, and an elongate rectangular closure strip closing off a space between the first wall and the inner first wall, the first nozzle being defined between the inner first wall, the side partitions and the main partition.

6. A nozzle assembly as claimed in claim 5, which includes a first central partition extending longitudinally of the nozzle assembly between the inner first wall and the main partition, to divide the first nozzle into substantially equal halves.

7. A nozzle assembly as claimed in claim 5, which includes: two second side partition elements disposed within the housing, adjacent the side walls and between the main partition and the second wall; a second central partition extending longitudinally of the nozzle assembly and a flow dividing partition, together forming said flow dividing member; an inner second wall element, located within the housing spaced from the second wall and extending between the second side partition elements and the flow dividing member, each of the second nozzles being defined by one of the second side partition elements, one of the inner second wall elements, the flow dividing partition and the main partition.

8. A nozzle assembly as claimed in claim 7, wherein each of the second nozzles has two parallel sides formed by the respective second side partition element and the flow dividing partition.

9. A nozzle assembly as claimed in claim 5, 7 or 8, which includes sound insulating material within the housing and around the first and second nozzles.

10. A nozzle assembly as claimed in claim 1, 4 or 7, which includes two inlets.

11. A nozzle assembly as claimed in claim 7, which includes sound insulating material within the housing and around the first and second nozzles, and which includes two inlets, which open on either side of the first and second central partitions with the flow from each inlet being divided substantially equally by the main partition.

12. A nozzle assembly as claimed in claim 11, wherein each inlet is of circular cross-section.

13. A vehicle drying apparatus comprising a support structure; producer means for supplying air; and a nozzle assembly which comprises a housing having an inlet connected to the producer means, a main, transverse partition within the housing dividing air flow from the inlet into a first part flow passing on one side of the partititon and a substantially equal, second part flow passing on the other side of the main partition with the second part flow behind the first part flow, a first nozzle for the part flow, defined by the housing and said one side of the main partition, a flow dividing member located between the first partition and the housing and dividing the second part flow into two substantially equal fow portions, two second nozzles from the two flow portions, defined between the housing, the main partition and the flow dividing member, the two second nozzles being arranged symetrically on either side of an axis of the nozzle assembly and being directed to either side of the nozzle assembly, which nozzle assembly is connected to the support structure by a linkage permitting vertical movement of the nozzle assembly; whereby, in use, when a vehicle passes underneath the nozzle assembly, the nozzle assembly traverses a surface of the vehicle, air flow from the first nozzle is primarily deflected both forwards and backwards in a longitudinal direction relative to that surface, and air flows from the second nozzles are deflected primarily sideways relative to that surface, to displace standing water sideways off that surface, a rounded air flow pattern being formed in front of the nozzle assembly.

14. A vehicle drying apparatus comprising:
a support structure;
producer means for supplying air;
two air supply hoses connected to the producer means; and
a nozzle assembly which comprises:
a housing comprising an end wall, two side walls extending from either side of the end wall, first and second walls extending from the end wall and between the side walls, and two inlets in the end wall, which inlets are connected to the hoses;
a main, transverse partition within the housing extending between the side walls, with the first and second walls disposed symetrically on either side of the main partition, and arranged to divide airflow from the inlets into first and second substantially equal part flows, passing on either side of the partition;
a first nozzle defined by an inner first wall disposed inside the housing adjacent and spaced from the first wall, two side partitions, corresponding to the two side walls and disposed within the housing adjacent and spaced from the side walls, and an elongate rectangular closure strip closing off a space between the first wall and the inner first wall, with the main partition defining one side of the first nozzle; and
two second nozzles, defined by two second side partition elements disposed within the housing adjacent the side walls and between the main partition and the second wall, a second central partition extending longitudinally off the nozzle assembly a flow dividing partition, together forming said flow dividing member, an inner second wall element located within the housing spaced from the second wall and extending between the second side partition elements and the flow dividing member with the main partition defining one side of each second nozzle;
wherein the two second nozzles are arranged symetrically on either side of an axis of the nozzle assembly and are directed to either side of the nozzle assembly;
whereby, in use, when a vehicle surface passes underneath the nozzle assembly, air flow from the first nozzle is primarily deflected both forwards and backwards in a longitudinal direction off the surface, and air flows from the second nozzles are deflected primarily sideways to displace standing water sideways off the surface, a rounded air flow pattern being formed in front of the nozzle assembly.

15. A vehicle drying apparatus as claimed in claim 14, wherein the nozzle assembly is provided with wheels and is connected to the support structure by a linkage means for applying a uniform downward pressure to the nozzle assembly irrespective of its position, whereby, in use, a vehicle can be passed beneath the nozzle assembly and the wheels enable the nozzle assembly to travel over the vehicle whilst being maintained against it at a constant pressure.

* * * * *